Oct. 22, 1929.  M. J. ANDRADE  1,732,297
MUSICAL INSTRUMENT
Filed Nov. 8, 1926
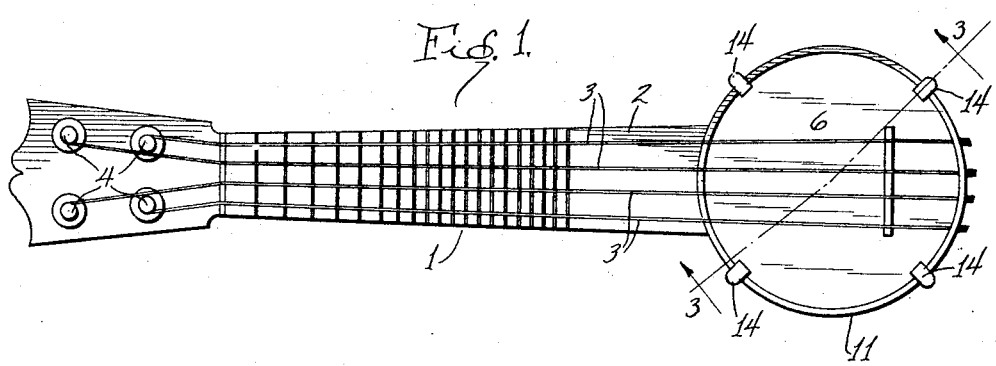
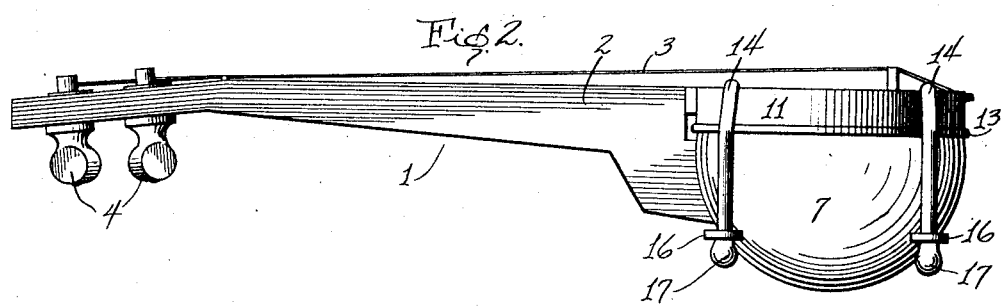
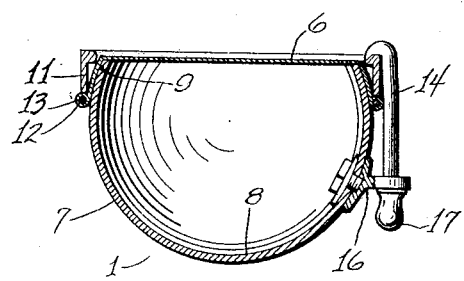
INVENTOR
M. J. ANDRADE
BY
ATTORNEY Patented Oct. 22, 1929

1,732,297

UNITED STATES PATENT OFFICE

MANUEL J. ANDRADE, OF OAKLAND, CALIFORNIA

MUSICAL INSTRUMENT

Application filed November 8, 1926. Serial No. 146,899.

The present invention relates to improvements in musical instruments, and has particular reference to a banjo, its principal object being to provide a banjo head that is very inexpensive and gives excellent results. I have found that the dry shell of a cocoanut makes a splendid bowl for a banjo head, and is, at the same time, very inexpensive. The structure of a cocoanut shell seems to be particularly effective on account of its uniformness and on account of the absence of any grain. A cocoanut shell cut slightly above a central plane, so as to present a slightly converging rim, makes an excelent bowl for a banjo head and is exactly of the right shape for fastening a membrane thereto by means of the hoop ordinarily employed for this purpose.

Further objects and advantages of my invention will appear as the specification proceeds.

The preferred form of my invention is illustrated in the accompanying drawing in which—

Figure 1 shows a plan view of my banjo,
Figure 2 is a side view thereof, and
Figure 3 a section taken along lines 3—3 of Figure 1.

While I have shown only the preferred form of the invention, it should be understood that various changes or modifications may be made within the scope of the claims hereto attached without departing from the spirit of the invention.

The general features of a banjo are well known in the art and comprise a banjo head 1, the neck 2, the strings 3 stretched from one extremity of the head to the adjusting elements 4 at the opposite end of the neck, and a membrane 6 stretched across the banjo head. The banjo head comprises the bowl 7 consisting of the dried shell of a cocoanut cut at a plane somewhat above and parallel to a central plane so that the bowl presents a semispherical body section 8 and a converging rim 9. The membrane 6 is stretched across this rim and is held in place by means of the hoop 11 about the lower curled edge 12 of which the extreme rim of the membrane is curled as shown at 13. The hoop is held in place by means of a plurality of hooks 14 engaging with the upper rim of the hoop and extending downwardly thru brackets 16 fastened to the bowl in any suitable manner, the hooks being tightened upon the rim of the hoop by means of nuts 17 engaging the threaded ends thereof and bearing on the brackets.

The advantages of my invention will be understood from the foregoing description. Cocoanut shells may be secured practically without expense and may be properly dried at a nominal cost. The hollow shell, due to the uniformness of its structure, gives excellent tone qualities. A cocoanut shell of ordinary proportions is just about of the right dimensions.

I claim:

1. A banjo head comprising a dry cocoanut shell cut above a central plane thereof to provide a converging rim above a substantially semi-spherical body, a membrane stretched across the shell, said membrane having a rolled edge; a hoop on the outside of the shell engaging said rolled edge of the membrane for clamping the membrane upon the rim, and a hook secured to the cocoanut for holding the hoop in place.

2. A banjo head comprising a dry cocoanut shell cut above a central plane thereof to provide a converging rim above a substantially semi-spherical body, a membrane stretched across the shell, said membrane having a rolled edge; a hoop on the outside of the shell engaging said rolled edge of the membrane for clamping the membrane upon the rim, a hook for holding the hoop in place, and a bracket secured to said cocoanut shell for supporting said hook, so that said hook presses said hook against the rolled edge upon the outside surface of the converging rim.

In testimony whereof I affix my signature.

MANUEL J. ANDRADE.